US 11,103,883 B2

(12) United States Patent
Lee et al.

(10) Patent No.: US 11,103,883 B2
(45) Date of Patent: Aug. 31, 2021

(54) CENTRIFUGE AND CENTRIFUGATION METHOD USING FILTER

(71) Applicant: MEDIKAN CO., LTD., Seoul (KR)

(72) Inventors: Hee Young Lee, Seoul (KR); Hyun Jin Yang, Seoul (KR); Dae Chang Bae, Goyang-si (KR)

(73) Assignee: MEDIKAN CO., LTD., Seoul (KR)

( * ) Notice: Subject to any disclaimer, the term of this patent is extended or adjusted under 35 U.S.C. 154(b) by 627 days.

(21) Appl. No.: 15/781,548

(22) PCT Filed: Dec. 8, 2016

(86) PCT No.: PCT/KR2016/014362
§ 371 (c)(1),
(2) Date: Jun. 5, 2018

(87) PCT Pub. No.: WO2017/099487
PCT Pub. Date: Jun. 15, 2017

(65) Prior Publication Data
US 2020/0290059 A1      Sep. 17, 2020

(30) Foreign Application Priority Data

Dec. 9, 2015   (KR) .................. 10-2015-0175269
Dec. 8, 2016   (KR) .................. 10-2016-0166582

(51) Int. Cl.
*B04B 3/00*      (2006.01)
*B04B 7/16*      (2006.01)
*B04B 5/04*      (2006.01)

(52) U.S. Cl.
CPC ................. *B04B 3/00* (2013.01); *B04B 7/16* (2013.01); *B01D 2221/10* (2013.01); *B01L 2400/0409* (2013.01); *B04B 5/0442* (2013.01)

(58) Field of Classification Search
CPC ........... B04B 3/00; B04B 7/16; B04B 5/0442; B04B 5/04; B04B 2005/0478; B04B 7/00; B01D 2221/10; B01L 2400/0409
(Continued)

(56) References Cited

U.S. PATENT DOCUMENTS 8,790,519 B2 *   7/2014   Leach .................... B04B 11/06
                                                    210/781
2004/0029696 A1 *  2/2004   Mackel .................... B04B 1/10
                                                    494/36

FOREIGN PATENT DOCUMENTS

JP     11-314011 A      11/1999
KR     10-0680136 B1    2/2007
(Continued)

OTHER PUBLICATIONS

International Search Report of PCT/KR2016/014362 filed Mar. 20, 2017.
(Continued)

*Primary Examiner* — Walter D. Griffin
*Assistant Examiner* — Shuyi S. Liu
(74) *Attorney, Agent, or Firm* — Sughrue Mion, PLLC

(57) ABSTRACT

Provided is a centrifuge including: a rotary chamber configured to rotate so that centrifugal force acts on a substance contained in the rotary chamber; a storage unit configured to store a certain component separated from the substance in the rotary chamber by the centrifugal force according to rotation of the rotary chamber; and a filter located between the storage unit and the rotary chamber and through which the certain component, which is separated from the substance in the rotary chamber by the centrifugal force according to the rotation of the rotary chamber, passes to be stored in the storage unit. The storage unit includes a return prevention unit configured to prevent the certain component, which is separated from the substance in the rotary chamber (Continued)

by the centrifugal force according to the rotation of the rotary chamber and is stored in the storage unit, from returning from the storage unit to the rotary chamber. The present disclosure has an effect of easily separating a certain component sought to be separated.

12 Claims, 7 Drawing Sheets

(58) Field of Classification Search
USPC .................................................. 494/36, 37
See application file for complete search history.

(56) References Cited

FOREIGN PATENT DOCUMENTS

| | | |
|---|---|---|
| KR | 10-0721258 B1 | 5/2007 |
| KR | 10-0767448 B1 | 10/2007 |
| KR | 10-0772969 B1 | 11/2007 |
| KR | 10-0772970 B1 | 11/2007 |
| KR | 10-2011-0083671 A | 7/2011 |
| KR | 10-1128986 B1 | 3/2012 |
| KR | 10-2014-0135093 A | 11/2014 |

OTHER PUBLICATIONS

Communication dated Jul. 3, 2018, issued by the Korean Intellectual Property Office in counterpart application No. 10-2016-0166582.

* cited by examiner

CENTRIFUGE AND CENTRIFUGATION METHOD USING FILTER

This application is National Stage of International Application No. PCT/KR2016/014362 filed Dec. 8, 2016, claiming priority from Korean Patent Application No. 10-2015-0175269 filed Dec. 9, 2015 and Korean Patent Application No. 10-2016-0166582 filed Dec. 8, 2016.

TECHNICAL FIELD

The present disclosure relates to a centrifuge and a centrifugation method of separating a large amount of substances, and more particularly, to a centrifuge and a centrifugation method of separating a certain substance from the large amount of substances by using centrifugal force and filters.

BACKGROUND ART

A centrifuge is a device for separating substances by using centrifugal force generated when an object rotates. The centrifuge may be classified according to an amount of a sample to be centrifuged, rotation speed, a rotor, and the like. A centrifuge and a centrifugation method of separating substances may be used in various fields such as the medical industry.

For example, in a biotechnology laboratory, a centrifuge may be used to separate a fluid from a substance including a complex fluid (a fluid including semi-solid components such as fine solid components or gel and having a broader range than a polymer; hereinafter, referred to as 'fluid') such as blood.

A fluid centrifuged by a centrifuge is stacked into layers in a container according to the specific gravity, and the stacked layers need to be separated. Various methods can be used for such separation. In general, separating the layers of the fluid by hand takes a lot of efforts, and purity of separated materials cannot be secured, and moreover, the separated materials may sometimes be lost. As another method, an upper stacked layer of the fluid is removed using a pipette, but a portion of the fluid to be removed still remains so that dilution has to be performed.

To solve the aforementioned problems, a technology of mechanically separating materials having the greatest specific gravity when they are accumulated on an outer peripheral surface of a cylindrical rotary chamber during its rotation has been used, but the technology cannot be widely used. That is, the above separation technology can be used only when a quantity of materials sought to be separated is sufficient enough to cover the entire inner wall of the cylindrical rotary chamber, and it is not easy to perform separation of the centrifuged and stacked layers according to their one-dimensional thicknesses. In particular, the above separation method is not suitable to classify traces of cell samples.

When cells are centrifuged by a centrifuge, separated layers can be distinguished visually, but it is difficult to physically separate the layers. A liquid in a layer right above the cells mostly contains water components. When a container is slowly tilted to separate the liquid, the cells in the lowermost layer also move, and thus the separated cells may be lost due to centrifugation. Since cohesive or adhesive force between cells is not significantly different from properties of water when centrifugal force is not applied, a probability that only the liquid in the upper layer is successfully separated is less than 50%. Even when the liquid separation succeeds, some cells in the uppermost layer can be lost. When centrifugal force is increased to increase adhesion between the cells, the cells may be destroyed.

Since a centrifuge used for biotechnology needs to separate cells of a human body without destruction of the cells, centrifugal force that is not sufficient to destroy the cells is applied. The centrifugal force allowed to centrifuge the cells is 100 G at most and is generally lower than 100 G. Here, G denotes a gravitational constant. Since centrifugal force is generally applied as gravity in a centrifuge, centrifugal force will be represented using the unit 'G'.

There is the demand for a method and means of separating a fluid into stacked layers from a substance including a complex fluid by using a centrifuge and more effectively separating a desired component from the fluid.

DESCRIPTION OF EMBODIMENTS

Technical Problem

Provided are various centrifuges and centrifugation methods of effectively separating desired components of a fluid from a substance including a complex fluid.

Moreover, in order to effectively separate desired components of a fluid from a substance including a complex fluid, provided are a centrifuge and a centrifugation method of filtering the fluid from the substance by centrifugal force, allowing the desired components of the filtered fluid to remain to separate the desired components.

Solution to Problem

According to an aspect of the present disclosure, there is provided a centrifuge including: a rotary chamber configured to rotate so that centrifugal force acts on a substance contained in the rotary chamber; a storage unit configured to store a certain component separated from the substance in the rotary chamber by the centrifugal force according to rotation of the rotary chamber; and a filter located between the storage unit and the rotary chamber and through which the certain component, which is separated from the substance in the rotary chamber by the centrifugal force according to the rotation of the rotary chamber, passes to be stored in the storage unit. The storage unit includes a return prevention unit configured to prevent the certain component, which is separated from the substance in the rotary chamber by the centrifugal force according to the rotation of the rotary chamber and is stored in the storage unit, from returning from the storage unit to the rotary chamber.

A vertical cross-section of the rotary chamber may narrow from a top portion to a bottom portion of the rotary chamber, and a horizontal cross-section area of the rotary chamber may decrease from the top portion to the bottom portion of the rotary chamber.

The storage unit may include a plurality of storage elements arranged at locations that are symmetrical to each other with respect to a rotation center axis of the rotary chamber.

The return prevention unit may be configured to allow a component, which has a smaller size than the certain component separated from the substance in the rotary chamber by the centrifugal force according to the rotation of the rotary chamber and being stored in the storage unit, to return from the storage unit to the rotary chamber.

The return prevention unit may have an inclined surface that is inclined upwards from a bottom of the storage unit to a top portion of the return prevention unit that is connected to the rotary chamber.

The filter may not pass a component having a greater size than the certain component separated from the substance in the rotary chamber.

A size of a mesh of the filter may range from 1 μm to 2000 μm.

A size of a mesh of the filter may range from 10 μm to 1000 μm.

The centrifuge may further include: a cover configured to cover a top portion of the rotary chamber; and a storage cover configured to cover a top portion of the storage unit.

According to another aspect of the present disclosure, a centrifugation method including: rotating a rotary chamber containing a substance to be centrifuged so that centrifugal force acts on the substance; passing, through a filter, the substance in the rotary chamber by increasing the centrifugal force according to rotation of the rotary chamber, separating a certain component and a component having a smaller size than the certain component from the substance, and storing the certain component and the component in a storage unit; allowing the certain component stored in the storage unit to remain in the storage unit by decreasing the centrifugal force according to the rotation of the rotary chamber, and allowing the component having the smaller size than the certain component stored in the storage unit to return to the rotary chamber by gravity; and discharging the certain component remaining in the storage unit to the outside.

The filter may not pass a component having a greater size than a certain component in the rotary chamber from the substance in the rotary chamber.

The certain component stored in the storage unit may be prevented from returning to the rotary chamber by gravity.

The certain component remaining in the storage unit may be discharged to the outside through a discharge pipe connected to an outlet of the storage unit.

Advantageous Effects of Disclosure

According to a centrifuge and a centrifugation method, a certain component is filtered and separated from a substance by centrifugal force by using a filter, and the filtered component is prevented from inversely passing through the filter even though centrifugal force smaller than the centrifugal force, and thus the certain component is easily separated from the substance. A component having a smaller size than the separated component inversely passes through the filter for removal by decreasing the centrifugal force, and the separated component is prevented from passing through the filter despite the decreased centrifugal force. Therefore, the certain component can be easily separated.

MODE OF DISCLOSURE

The present disclosure will be described in detail based on the following embodiments. These embodiments are provided so that the present disclosure will convey the concept of the present disclosure to one of ordinary skill in the art. The present disclosure may be embodied in many different forms and should not be construed as being limited to the embodiments set forth herein.

Embodiment 1

Figure 1:
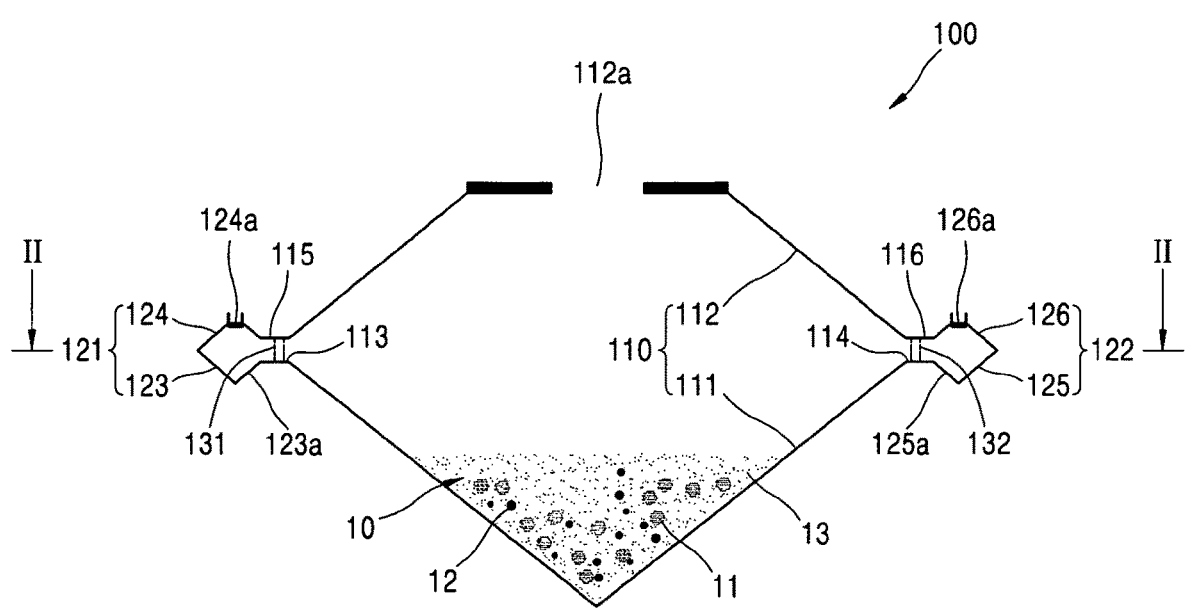
FIG. 1 is a vertical cross-sectional view of a centrifuge that schematically illustrates a state in which a substance to be centrifuged is contained in the centrifuge when a rotary chamber stops.

As illustrated in FIG. 1, in the present embodiment, a centrifuge 100 includes a rotary chamber 110, a first storage unit 121, a second storage unit 122, a first filter 131, and a second filter 132.

The rotary chamber 110 may contain a substance 10 therein and rotates so that centrifugal force acts on the contained substance 10. Thus, the substance 10 may be separated by components. The substance 10 contained in the rotary chamber 10 and being subject to centrifugation may be a complex fluid such as blood. In general, the complex fluid contains other components in addition to a component sought to be separated. For example, the substance 10 contained in the rotary chamber 10 and being subject to centrifugation may include: a component 11 sought to be separated; a component 12 that has a solid phase and particles having a greater mean radius than the component 11 sought to be separated; and a component 13 that has a solid or liquid phase and particles having a smaller mean radius than the component 11 sought to be separated.

The rotary chamber 110 contains the substance 10 therein and rotates so that the centrifugal force acts on the contained substance 10. Thus, the substance 10 is separated by components. The rotary chamber 110 sequentially moves from a component of the substance 10, to which the greatest centrifugal force is applied, to a component, to which the smallest centrifugal force is applied, by the centrifugal force according to the rotation of the rotary chamber 110 and thus separates the substance 10 by components. To this end, the rotary chamber 110 may have various configurations. For example, as conceptually illustrated in FIG. 1, the rotary chamber 110 may include a vertical guide unit 111 and horizontal guide units 113. However, one or more embodiments are not limited thereto. The rotary chamber 110 may have other configurations. Although not illustrated in FIG. 1, the rotary chamber 110 may further include a driving device that rotates the rotary chamber 110 in such a manner that the centrifugal force acts on the contained substance 10. In addition, the rotary chamber 110 may further include a cover 112 covering an upper portion of a housing portion.

In order to minimize surface resistance when the substance 10 contained in the rotary chamber 110 is moved, an inner surface of the rotary chamber 110 may be coated with fluororesin such as teflon. Therefore, the substance 10 contained in the rotary chamber 110 may actively move on the inner surface by the centrifugal force according to the rotation of the rotary chamber 110.

The vertical guide unit 111 contains the substance 10 to be centrifuged and guides the contained substance 10 to be moved to the storage units 121 and 122 by the centrifugal force according to the rotation of the rotary chamber 110. Thus, the vertical guide unit 111 may have various shapes. For example, the vertical guide unit 111 may have a tapered vertical cross-section that narrows from the top to the bottom. As illustrated in FIG. 1, a shape of the vertical cross-section of the vertical guide unit 111 may be an inverted triangle. However, one or more embodiments are not limited thereto. The shape of the vertical cross-section of the vertical guide unit 111 may be the inverted triangle, which have oblique sides being convex or concave inwards or outwards, or an inverted trapezoid.

A horizontal cross-section of the vertical guide unit 111 may be circular. However, one or more embodiments are not limited thereto. The horizontal cross-section of the vertical guide unit 111 may have various shapes. Also, a horizontal cross-section area of the vertical guide unit 111 may decrease from the top to the bottom. For example, the vertical guide unit 111 may have an inverted cone shape having the circular horizontal cross-section and an area decreasing from the top to the bottom. Accordingly, due to the imbalance of the centrifugal force due to rapid rotation of the rotary chamber 110, shaking of the rotary chamber 110 may be significantly prevented.

As illustrated in FIG. 1, when the rotary chamber 111 is stopped, the substance 10 contained in the rotary chamber 110 is located at the bottom center of the vertical guide unit 111 due to the gravity acting on the substance 10.

The horizontal guide units 113 and 114 guide a substance flowing from the vertical guide unit 111 to the outside. The horizontal guide units 113 and 114 may have various configurations. For example, as illustrated in FIG. 1, the horizontal guide units 113 and 114 may be the first horizontal guide unit 113, which extends towards the outside from any one portion of an upper edge of the vertical guide unit 111, and the second horizontal guide unit 114 which extends towards the outside from another portion of the upper edge of the vertical guide unit 111 and is symmetrical to the first horizontal guide unit 113. However, one or more embodiments are not limited thereto. The horizontal guide units 113 and 114 may extend towards the outside from the entire upper edge of the vertical guide unit 111. The horizontal guide units 113 and 114 may be non-detachably combined with the vertical guide unit 111 so that the horizontal guide units 113 and 114 and the vertical guide unit 111 cannot be separated from each other, or the horizontal guide units 113 and 114 may be detachably combined with the vertical guide unit 111. A determination on a preferable degree in which the horizontal guide units 113 and 114 extend towards the outside may be appropriately made by considering various factors such as a substance to be centrifuged, a component sought to be separated, and the rotation speed of the rotary chamber 110.

Figure 2:
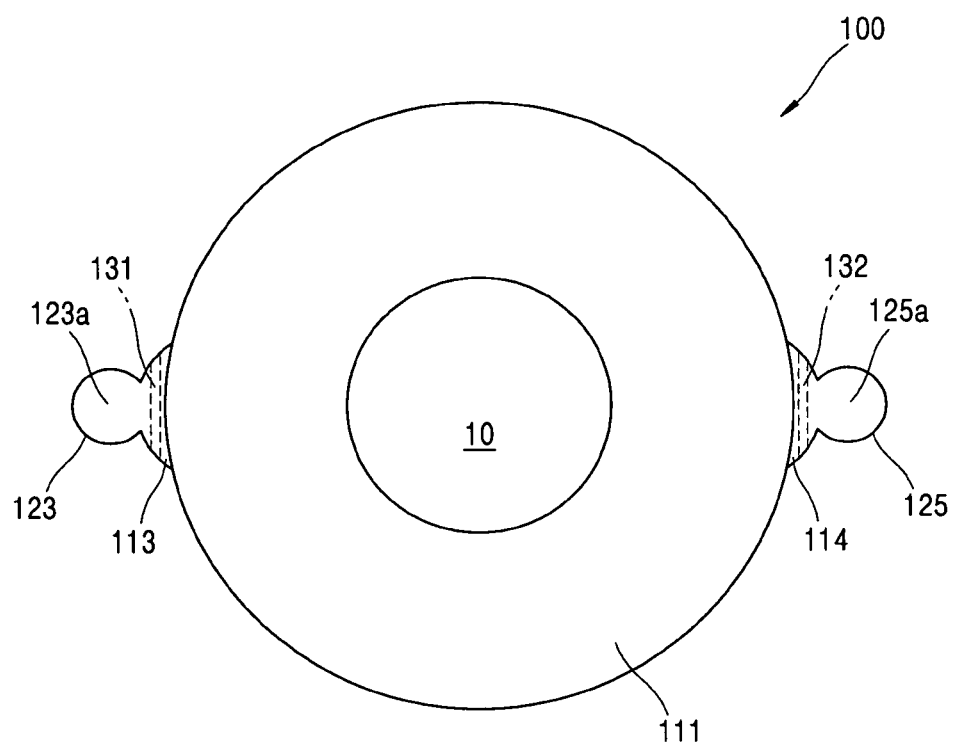
FIG. 2 is a horizontal cross-sectional view of a centrifuge that schematically illustrates a cross-section taken along a line II-II of FIG. 1.
Figure 3:
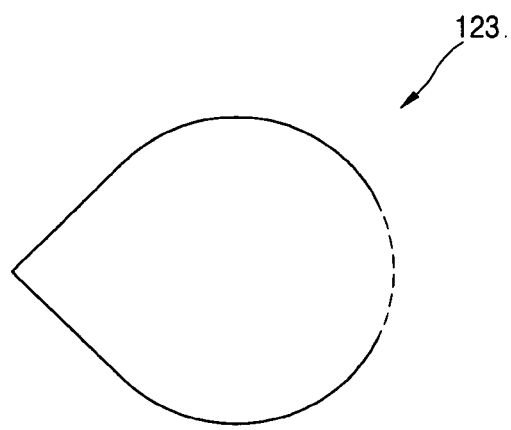
FIGS. 3 to 6 are schematic diagrams that variously illustrate horizontal cross-sections of a first storage body of the centrifuge of FIG. 1.
Figure 4:
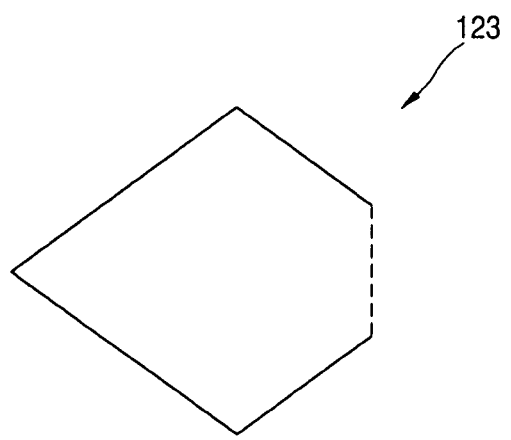
Figure 5:
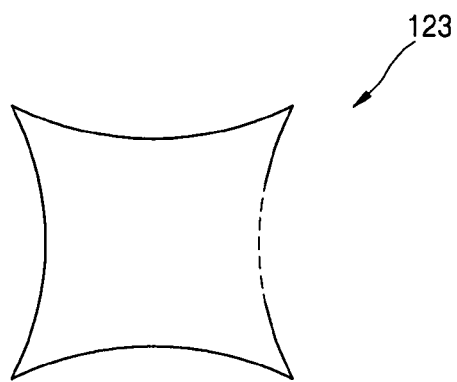
Figure 6:
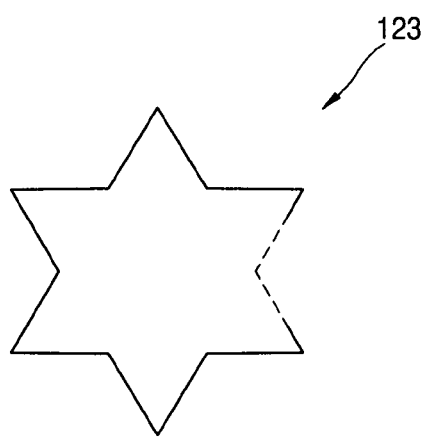

As illustrated in FIG. 2, the first horizontal guide unit 113 may extend towards the outside from any one portion of the upper edge of the vertical guide unit 111 and thus may be connected to the first storage unit 121. Thus, the substance 10 guided by the vertical guide unit 111 is guided to the first storage unit 121 connected to the first horizontal guide unit 113 instead of being guided to the entire upper edge of the vertical guide unit 111 and is concentrated in the first storage unit 121, thereby improving the separation efficiency.

The first horizontal guide unit 113 may be designed to smoothly guide the substance 10 flowing from the vertical guide unit 111 to the first storage unit 121. Thus, the first horizontal guide unit 113 is connected to the vertical guide unit 111 and is connected to the first storage unit 121 on a portion where the substance 10 flowing from the vertical guide unit 111 passes, and has a cross-section area decreasing towards the portion where the substance moved to the first storage unit 121 passes. For example, as illustrated in FIG. 2, a pair of circular arcs of the first horizontal guide unit 113 face each other in such a manner that the horizontal cross-section of the first horizontal guide unit 113 is convex outwards, and a gap between the circular arcs may decrease from the portion of the first horizontal guide unit 113 that is connected to the vertical guide unit 111 towards the portion of the first horizontal guide unit 113 that is connected to the first storage unit 121. Also, as illustrated in FIG. 1, the vertical cross-section of the first horizontal guide unit 113 may include horizontal lines. However, one or more embodiments are not limited thereto. The first horizontal guide unit 113 may have various shapes. For example, the first horizontal guide unit 113 may have the vertical cross-section that is inclined upwards from the portion connected to the vertical guide unit 111 towards the portion connected to the first storage unit 121. Therefore, the first horizontal guide unit 113 may smoothly guide the substance 10 flowing from the vertical guide unit 111 to the first storage unit 121, and the substance 10 may be concentrated in the first storage unit 121.

As illustrated in FIG. 2, the second horizontal guide unit 114 extends towards the outside from a portion of the upper edge of the vertical guide unit 111, which is symmetrical to the first horizontal guide unit 113, and is connected to the second storage unit 122. Thus, the substance 10 guided by the vertical guide unit 111 is guided to the second storage unit 122 connected to the second horizontal guide unit 114 instead of being guided to the entire upper edge of the vertical guide unit 111 and is concentrated in the second storage unit 122, thereby improving the separation efficiency.

The second horizontal guide unit 114 is designed to smoothly guide the substance 10 flowing from the vertical guide unit 111 towards the second storage unit 122. Thus, the second horizontal guide unit 114 is connected to the vertical guide unit 111 and to the second storage unit 122 on a portion where the substance 10 flowing from the vertical guide unit 111 passes, and has a cross-section area decreasing towards the portion where the substance 10 moved to the second storage unit 122 passes. For example, as illustrated in FIG. 2, a pair of circular arcs of the second horizontal guide unit 114 face each other in such a manner that the horizontal cross-section of the second horizontal guide unit 114 is convex outwards, and a gap between the circular arcs may decrease from the portion of the second horizontal guide unit 114 that is connected to the vertical guide unit 111 towards the portion of the second horizontal guide unit 114 that is connected to the second storage unit 122. Also, as illustrated in FIG. 1, the vertical cross-section of the second horizontal guide unit 114 may include horizontal lines. However, one or more embodiments are not limited thereto. The second horizontal guide unit 114 may have various shapes. For example, the second horizontal guide unit 114 may have the vertical cross-section that is inclined upwards from the portion connected to the vertical guide unit 111 towards the portion connected to the second storage unit 122. Therefore, the second horizontal guide unit 114 may smoothly guide the substance 10 flowing from the vertical guide unit 111 to the second storage unit 122, and the substance 10 may be concentrated in the second storage unit 122.

The cover 112 covers the top portion of the vertical guide unit 111. To this end, the cover 112 may have various configurations. For example, as illustrated in FIG. 1, the cover 112 may have a shape extending to correspond to the top portion of the vertical guide unit 111. The cover 112 may be detachably or non-detachably combined with the vertical guide unit 111. In addition, the cover 112 may further include an inlet 112a through which the substance 10 from the vertical guide unit 111 is injected.

The cover 112 may further include a portion 115 covering the top portion of the first horizontal guide unit 113 and a portion 116 covering the top portion of the second horizontal guide unit 114. The portion 115 of the cover 112, which covers the top portion of the first horizontal guide unit 113, and the portion 116 of the cover 112, which covers the top portion of the second horizontal guide unit 114, may extend to correspond to the top portion of the first horizontal guide unit 113 and the top portion of the second horizontal guide unit 114, respectively.

The storage units 121 and 122 store therein the component 11 separated from the substance 10, which is contained in the rotary chamber 110, by the centrifugal force according to the rotation of the rotary chamber 110. Thus, the storage units 121 and 122 may each have various configurations. As illustrated in FIG. 1, for example, the storage units 121 and 122 may be the first storage unit 121 and the second storage unit 122. The storage units 121 and 122 may further store the component 13 have a smaller size than the component 11 separated from the substance 10 contained in the rotary chamber 110, in addition to the component 11. This is because the component 13, which has the smaller size than the component 11 separated from the substance 10 in the rotary chamber 110 due to the centrifugal force according to the rotation of the rotary chamber 110, may pass through the filters 131 and 132 to be described below and then may be stored in the storage units 121 and 122.

The first storage unit 121 is connected to the first horizontal guide unit 113 and stores the component 11 which is separated from the substance 10 in the rotary chamber 110 due to the centrifugal force according to the rotation of the rotary chamber 110, passes through the vertical guide unit 111, and is guided by the first horizontal guide unit 113. To this end, the first storage unit 121 may have various configurations. For example, as illustrated in FIGS. 1 and 2, the first storage unit 121 may include a first storage body 123 and further include a first storage cover 124.

The first storage body 123 stores the component 11 which is separated from the substance 10 in the rotary chamber 110 due to the centrifugal force according to the rotation of the rotary chamber 110, passes through the vertical guide unit 111, and is guided by the first horizontal guide unit 113. Thus, the first storage body 123 may have a concave shape so that the component 11 separated from the substance 10 in the rotary chamber 11 may be stored. For example, as illustrated in FIGS. 1 and 2, a vertical cross-section of the first storage body 123 narrows from a top portion of the first storage body 123 towards a bottom portion thereof, and a horizontal cross-section of the first storage body 123 has a circular shape. Accordingly, the first storage body 123 may have an inverted cone shape. However, one or more embodiments are not limited thereto. The first storage body 123 may have various shapes. Examples of the horizontal cross-section of the first storage body 123 are illustrated in FIGS. 3 to 6.

It is preferable that the first storage body 123 has at least a size in which the component 11, which is separated from the substance 10 in the rotary chamber 110 due to the centrifugal force according to the rotation of the rotary chamber 110, is stored after the rotary chamber 110 stops.

It is preferable that the first storage body 123 has at least a size that is smaller than a size in which the component 11, which is separated from the substance 10 in the rotary chamber 110 due to the centrifugal force according to the rotation of the rotary chamber 110, and the component 13 having the smaller size than the component 11 are stored together after the rotary chamber 110 stops. Thus, from a point in time when the centrifugal force according to the rotation of the rotary chamber 110 is less than a certain degree to a point in time when the centrifugal force stops being applied, the component 13 having the smaller size than the component 11 deviates from the first storage body 123 and easily returns to the inside of the rotary chamber 110, and thus separation efficiency of the component 11 may be greatly improved.

It is preferable that the first storage body 123 includes a first return prevention unit 123a for preventing the component 11, which is separated from the substance 10 in the rotary chamber 110 due to the centrifugal force according to the rotation of the rotary chamber 110 and is stored in the first storage body 123, from returning from the first storage body 123 to the rotary chamber 110. When the centrifugal force according to the rotation of the rotary chamber 110 decreases or stops being applied, gravity applies greater than the centrifugal force to the component 11, which is separated from the substance 10 in the rotary chamber 110 due to the centrifugal force according to the rotation of the rotary chamber 110 and is stored in the first storage body 123, and thus, the component 11 tends to deviate from the first storage body 123 and return to the rotary chamber 110. In this case, the component 11 stored in the first storage body 123 is prevented from returning to the rotary chamber 110 by the first return prevention unit 123a, and thus, separation efficiency may be improved. As illustrated in FIG. 1, the first return prevention unit 123a may have an inclined surface that is inclined upwards from the bottom center of the first storage body 123 to a portion of the first return prevention unit 123a that is connected to the first horizontal guide unit 113. A degree, in which the inclined surface of the first return prevention unit 123a is inclined, a length of the inclined surface, a shape thereof, etc. may be appropriately adjusted according to a type, characteristics, etc. of the component 11 stored in the first storage body 123.

It is preferable to enhance an effect of preventing the component 11 stored in the first storage body 123 from returning to the rotary chamber 110 by using the first return prevention unit 123a, but in this case, the return of the component 13, which has the smaller size than the component 11 and stored in the first storage body 123 together with the component 11, is increasingly prevented. Therefore, it is preferable to appropriately adjust the size, the shape, etc. of the first return prevention unit 123a so as to enhance of the effect of preventing the component 11 stored in the first storage body 123 from returning to the rotary chamber 110 by using the first return prevention unit 123a and to decrease the effect of restricting the return of the component 13 having the smaller size than the component 11 and stored in the first storage body 123 together with the component 11.

Figure 7:
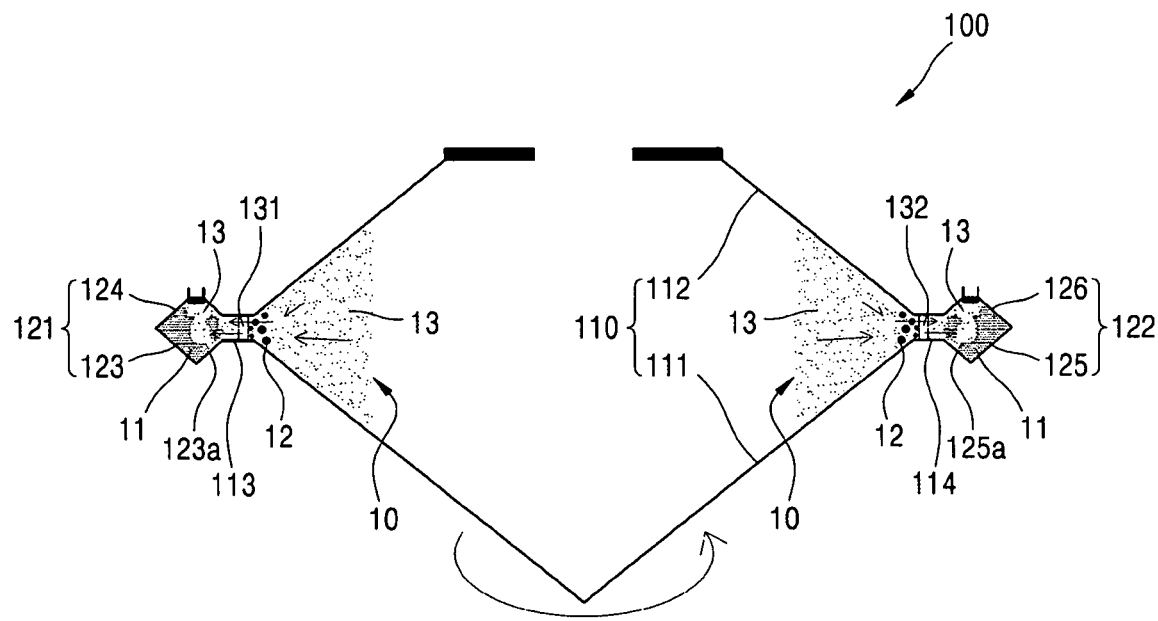
FIG. 7 is a vertical cross-sectional view of a centrifuge that schematically illustrates a state in which a substance, which is contained in a rotary chamber and is to be centrifuged, is moved to a storage unit when the rotary chamber rotates.

As illustrated in FIG. 7, when the centrifugal force according to the rotation of the rotary chamber 110 is applied, a component 12, which fails to pass through the first filter 131 among the substance 10 contained in the rotary chamber 110, fails to move to the first storage body 123 and thus remains in the rotary chamber 110, and the component 11 sought to be separated from the substance 10 passes through the first filter 131 and thus moves to the first storage body 123. In this case, however, the component 13, which is not subject to separation and has a smaller specific gravity or size than the component 11 sought to be separated, also passes through the first filter 131 and moves to the first storage body 123.

Figure 8:
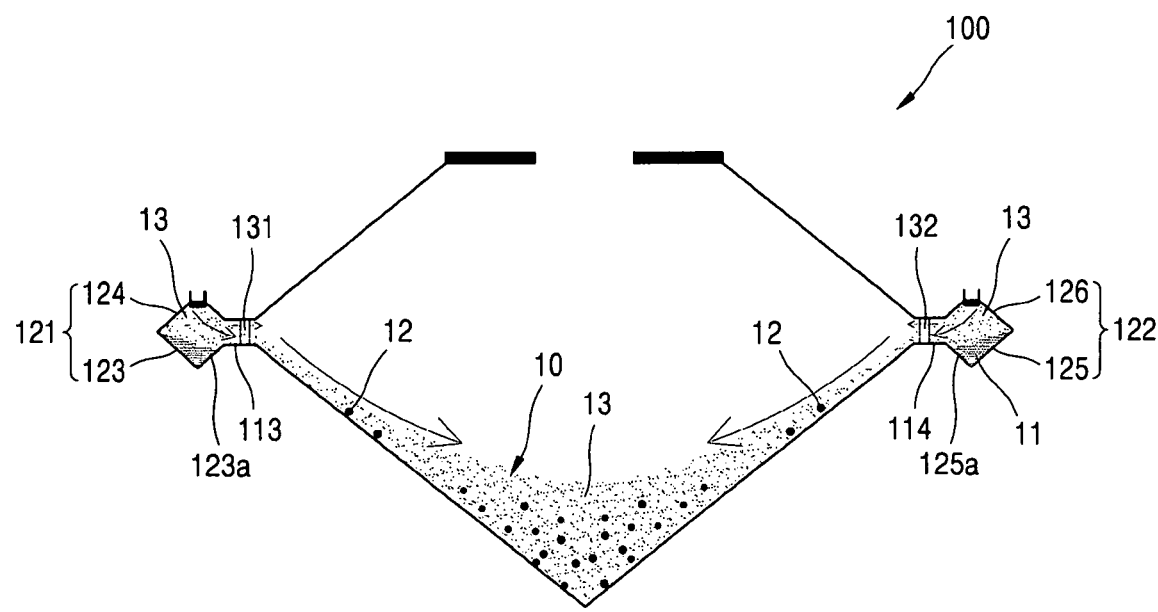
FIG. 8 is a vertical cross-sectional view of a centrifuge that schematically illustrates a state in which a substance, which is contained in a rotary chamber and is to be centrifuged, is returned from the storage unit to the rotary chamber when the rotary chamber rotates and then is stopped.

As illustrated in FIG. 8, when the centrifugal force according to the rotation of the rotary chamber 110 is less than a certain degree or stops being applied, the component 11 moving to the first storage body 123 is located at the bottom of the first storage body 123, and the component 13 having the smaller specific gravity or size than the component 11 may be located at the top of the first storage body 123. In this case, the component 13 having the smaller specific gravity or size than the component 11 is not disturbed by the first return prevention unit 123a, passes through the first filter 131, and easily returns to the rotary chamber 110. On the contrary, the component 11 is disturbed by the first return prevention unit 123a and fails to reach the first filter 131, thereby failing to return to the rotary chamber 110. As a result, a ratio of the component 11 to the entire amount of a substance remaining in the first storage body 123 increases, and thus, the separation efficiency may be significantly improved.

The first storage cover 124 covers the top portion of the first storage body 123. Thus, the first storage cover 124 may have various configurations. As illustrated in FIG. 1, for example, the first storage cover 124 may extend to correspond to the top portion of the first storage body 123. The first storage cover 124 may be detachably or non-detachably combined with the first storage body 123.

The first storage cover 124 may further include a first outlet 124a for discharging the component 11 separated from the substance 10 and stored in the first storage body 123. By connecting a connection pipe such as a hose to the first outlet 124a, the component 11 may be easily discharged to the outside without any contamination. In this case, since an additional pump or an additional storage tank is not required, a structure of a device may be simplified.

The first storage cover 124 may be detachably or non-detachably combined with the portion 115 covering the top portion of the first horizontal guide unit 113.

The second storage unit 122 is connected to the second horizontal guide unit 114 and stores the component 11 which is separated from the substance 10 in the rotary chamber 10 due to the centrifugal force according to the rotation of the rotary chamber 110, passes through the vertical guide unit 111, and is guided by the second horizontal guide unit 114. To this end, the second storage unit 122 may have various shapes. As illustrated in FIGS. 1 and 2, for example, the second storage unit 122 may include a second storage body 125 and may further include a second storage cover 126.

The second storage body 125 stores the component 11 which is separated from the substance 10 due to the centrifugal force according to the rotation of the rotary chamber 110, passes through the vertical guide unit 111, and is guided by the second horizontal guide unit 114. To this end, the second storage body 125 may have a concave shape such that the component 11 separated from the substance 10 in the rotary chamber 110 may be stored. For example, as illustrated in FIGS. 1 and 2, a vertical cross-section of the second storage body 125 may narrow from a top portion of the second storage body 125 towards a bottom portion thereof, and a horizontal cross-section of the second storage body 125 may have a circular shape. Thus, the second storage body 125 may have an inverted cone shape. However, one or more embodiments are not limited thereto. The second storage body 125 may have various shapes. Example shapes of the horizontal cross-section of the second storage body 125 may be the same as or similar to those of the horizontal cross-section of the first storage body 123 as illustrated in FIGS. 3 to 6.

It is preferable that the second storage body 125 has at least a size in which the component 11, which is separated from the substance 10 in the rotary chamber 110 due to the centrifugal force according to the rotation of the rotary chamber 110, is stored after the rotary chamber 110 stops.

It is preferable that the second storage body 125 has at least a size that is smaller than a size in which the component 11, which is separated from the substance 10 in the rotary chamber 110 due to the centrifugal force according to the rotation of the rotary chamber 110, and the component 13 having the smaller size than the component 11 are stored after the rotary chamber 110 stops. Thus, from a point in time when the centrifugal force according to the rotation of the rotary chamber 110 is less than a certain degree to a point in time when the centrifugal force stops being applied, the component 13 having the smaller size than the component 11 deviates from the second storage body 125 and easily returns to the inside of the rotary chamber 110, and thus separation efficiency of the component 11 may be greatly improved.

It is preferable that the second storage body 125 includes a second return prevention unit 125a for preventing the component 11, which is separated from the substance 10 in the rotary chamber 110 due to the centrifugal force according to the rotation of the rotary chamber 110 and is stored in the second storage body 125, from returning from the second storage body 125 to the rotary chamber 110. When the centrifugal force according to the rotation of the rotary chamber 110 decreases or stops being applied, gravity is applied greater than the centrifugal force to the component 11, which is separated from the substance 10 in the rotary chamber 110 due to the centrifugal force according to the rotation of the rotary chamber 110 and is stored in the second storage body 125, and thus, the component 11 tends to deviate from the second storage body 125 and return to the rotary chamber 110. In this case, the component 11 stored in the storage body 125 is prevented from returning to the rotary chamber 110 by the second return prevention unit 125a, and thus, the separation efficiency may be improved. As illustrated in FIG. 1, the second return prevention unit 125a may have an inclined surface that is inclined upwards from the bottom center of the second storage body 125 to a portion of the second return prevention unit 125a that is connected to the second horizontal guide unit 114. A degree, in which the inclined surface of the second return prevention unit 125a is inclined, a length of the inclined surface, a shape thereof, etc. may be appropriately adjusted according to a type, characteristics, etc. of the component 11 stored in the second storage body 125.

It is preferable to enhance an effect of preventing the component 11 stored in the second storage body 125 from returning to the rotary chamber 110 by using the second return prevention unit 125a, but in this case, the return of the component 13, which has the smaller size than the component 11 and stored in the second storage body 125 together with the component 11, is increasingly prevented. Therefore, it is preferable to appropriately adjust the size, the shape, etc. of the second return prevention unit 125a so as to enhance of the effect of preventing the component 11 stored in the second storage body 125 from returning to the rotary chamber 110 by using the second return prevention unit 125a and to decrease the effect of restricting the return of the component 13 having the smaller size than the component 11 and stored in the second storage body 125 together with the component 11.

When the centrifugal force according to the rotation of the rotary chamber 110 is applied, as illustrated in FIG. 7, a component 12, which fails to pass through the second filter 132 among the substance 10 in the rotary chamber 110, fails to move to the second storage body 125 and thus remains in the rotary chamber 110, and the component 11 passes through the second filter 132 and thus moves to the second storage body 125. In this case, however, the component 13, which is not subject to the separation and has the smaller specific gravity and size than the component 11, passes through the second filter 132 and thus moves to the second storage body 125.

As illustrated in FIG. 8, when the centrifugal force according to the rotation of the rotary chamber 110 decreases to be less than a certain degree or stops being applied, the component 11, which is separated from the substance 10 and moves to the second storage body 125, is located at the bottom of the second storage body 125, and the component 13 having the smaller specific gravity and size than the component 11 may be located at the top of the second storage body 125. In this case, the component 13 having the smaller specific gravity and size than the component 11 returns without being disturbed by the second return prevention unit 125a, passes through the second filter 132, and thus is able to easily return to the rotary chamber 110. On the contrary, the component 11 fails to return because of the disturbance of the second return prevention unit 125a, does not reach the second filter 132, and thus finally fails to return to the rotary chamber 110. As a result, a ratio of the component 11 to the entire amount of a substance remaining in the second storage body 125 increases, and thus, the separation efficiency may be significantly improved.

The second storage cover 126 covers the top portion of the second storage body 125. To this end, the second storage cover 126 may have various shapes. For example, as illustrated in FIG. 1, the second storage cover 126 may extend to correspond to the top portion of the second storage body 125. The second storage cover 126 may be detachably or non-detachably combined with the second storage body 125.

The second storage cover 126 may further include a second outlet 126a for discharging the component 11 stored in the second storage body 125. By connecting a connection pipe such as a hose to the second outlet 126a, the component 11 may be easily discharged to the outside without any contamination. In this case, since an additional pump or an additional storage tank is not required, a structure of a device may be simplified.

The second storage cover 126 may be detachably or non-detachably combined with the portion 116 of the top portion of the second horizontal guide unit 114.

The component 11, which is separated from the substance 10 in the rotary chamber 110 due to the centrifugal force according to the rotation of the rotary chamber 110, passes through the filters 131 and 132. To this end, the filters 131 and 132 may each have various shapes. For example, the filters 131 and 132 may be the first filter 131 and the second filter 132. However, one or more embodiments are not limited thereto, and each of the filters 131 and 132 may include one filter or three or more filters.

The first filter 131 may be located between the rotary chamber 110 and the first storage unit 121. For example, as illustrated in FIG. 7, the first filter 131 may be located on the first horizontal guide unit 113 between the vertical guide unit 111 of the rotary chamber 110 and the first storage unit 121. Thus, the first filter 131 may filter the component 12 having the greater specific gravity or size than the component 11 sought to be separated, without entirely moving, to the first storage unit 121, the substance 10 contained in the rotary chamber 110 by the centrifugal force according to the rotation of the rotary chamber 110. However, one or more embodiments are not limited thereto. The first filter 131 may be at an arbitrary location between the rotary chamber 110 and the first storage unit 121.

The first filter 131 passes the component 11, which is sought to be separated from the substance 10 in the rotary chamber 110, or the component 13 having the smaller specific gravity or size than the component 11, but does not pass the component 12 having the greater specific gravity or size than the component 11. For example, the first filter 131 passes the component which is sought to be separated from the substance 10, which is contained in the rotary chamber 110 and is subject to the centrifugation, together with other impurities such as blood corpuscles, plasma, free oil, and stem cells, and the component 13 having the smaller size or specific gravity than the component 11. However, the first filter 131 does not pass the component 12, for example, a solid matter that has an almost spherical shape, which has a relatively great specific gravity or size.

A size of a mesh of the first filter 131 may be adjusted within a certain range, according to the component 11 sought to be separated from the substance 10 contain in the rotary chamber 110. For example, when the component 11 sought to be separated from the substance 10 in the rotary chamber 110 is blood corpuscles, the size of the mesh of the first filter 131 may generally range from about 1 µm to about 2000 µm. When the component 11 sought to be separated from the substance 10 in the rotary chamber 110 is stem cells, and when centrifugal force of at least 10 G is applied, the size of the mesh of the first filter 131 may generally range from about 10 µm to about 1000 µm. As the size of the mesh of the first filter 131 is adjusted, the component 12 having the greater size or specific gravity than the component 11 sought to be separated from the substance 10 contained in the rotary chamber 110 may be filtered.

A cross-section area of the first filter 131 may be appropriately adjusted according to centrifugation speed or a centrifugation yield. For example, the cross-section area of the first filter 131 may increase to increase the centrifugation speed or may decrease to improve the centrifugation yield. However, one or more embodiments are not limited thereto. The cross-section area of the first filter 131 may be variously adjusted.

The second filter 132 may be located between the rotary chamber 110 and the second storage unit 122. For example, as illustrated in FIG. 7, the second filter 132 may be on the second horizontal guide unit 114 between the vertical guide unit 111 and the second storage unit 122. Thus, the substance 10 in the rotary chamber 110 due to the centrifugal force according to the rotation of the rotary chamber 110 does not entirely move towards the first storage unit 121, and the second filter 132 may filter the component 12 having the greater specific gravity or size than the component 11. However, one or more embodiments are not limited thereto.

The second filter 132 may be at an arbitrary location between the rotary chamber 110 and the second storage unit 122.

The second filter 132 may pass the component 11 sought to be separated from the substance 10 in the rotary chamber 110 or the component 13 having the smaller specific gravity or size than the component 11, but does not pass the component 12 having the greater specific gravity or size than the component 11. For example, the second filter 132 passes the component which is sought to be separated from the substance 10, which is contained in the rotary chamber 110 and is subject to the centrifugation, together with other impurities such as blood corpuscles, plasma, free oil, and stem cells, and the component 13 having the smaller size or specific gravity than the component 11. However, the second filter 132 does not pass the component 12, for example, a solid matter that has an almost spherical shape, which has a relatively great specific gravity or size.

A size of a mesh of the second filter 132 may be adjusted within a certain range, according to the component 11 sought to be separated from the substance 10 contain in the rotary chamber 110. For example, when the component 11 sought to be separated from the substance 10 in the rotary chamber 110 is blood corpuscles, the size of the mesh of the second filter 132 may generally range from about 1 μm to about 2000 μm. When the component 11 sought to be separated from the substance 10 in the rotary chamber 110 is stem cells, and when centrifugal force of at least 10 G is applied, it is preferable to adjust the size of the mesh of the second filter 132 within a range from about 10 μm to about 1000 μm. As the size of the mesh of the second filter 132 is adjusted, the component 12 having the greater size or specific gravity than the component 11 sought to be separated from the substance 10 contained in the rotary chamber 110 may be filtered.

A cross-section area of the second filter 132 may be appropriately adjusted according to centrifugation speed or a centrifugation yield. For example, the cross-section area of the second filter 132 may increase to increase the centrifugation speed or may decrease to improve the centrifugation yield. However, one or more embodiments are not limited thereto. The cross-section area of the second filter 132 may be variously adjusted.

The operation of the centrifuge according to the present embodiment will be described.

When the substance 10, which is subject to the centrifugation, is injected into the rotary chamber 110 through the inlet 112a of the cover 112 of the rotary chamber 110, as illustrated in FIG. 1, the substance 10 is at the bottom center of the rotary chamber 110 before the rotary chamber 110 rotates.

When the rotary chamber 110 rotates, the substance 10, which is subject to the centrifugation and contained in the rotary chamber 110 due to the centrifugal force according to the rotation the rotary chamber 110, may move upwards along an inner surface of the vertical guide unit 111 of the rotary chamber 110.

When the centrifugal force according to the rotation of the rotary chamber 110 increases and reaches a certain degree, as illustrated in FIG. 7, the substance 10 that is contained in the rotary chamber 110 and subject to the centrifugation is guided by the first and second horizontal guide units 113 and 114 and the vertical guide unit 111 of the rotary chamber 110, passes through the first and second filters 131 and 132, and thus is stored in the first and second storage units 121 and 122. In this case, the component 11, which is sought to be separated from the substance 10 contained in the rotary chamber 110 and being subject to the centrifugation, and the component 13 having the smaller size or specific gravity than the component 11 pass through the first and second filters 131 and 132 and move to the first and second storage units 121 and 122. However, the second component 12 having the greater size or specific gravity than the component 11 fails to pass through the first and second filters 131 and 132 and to move to the first and second storage units 121 and 122. In this case, when content of the component 11 and the component 13 having the smaller size or specific gravity than the component 11 is greater than storage capacities of the first and second storage units 121 and 122, only part of the component 13 moves to the first and second storage units 121 and 122. In this case, the component 11 sought to be separated is located on the bottom portions of the first and second storage units 121 and 122, and the component 13 having the smaller size or specific gravity than the component 11 is located on the top portions of the first and second storage units 121 and 122.

When the centrifugal force according to the rotation of the rotary chamber 110 is decreased to be less than the certain degree, the component 11 sought to be separated and moving to the first and second storage units 121 and 122 and the component 13 having the smaller size or specific gravity than the component 11 are increasingly affected by the gravity. Therefore, as illustrated in FIG. 8, the component 13, which has the smaller size or specific gravity than the component 11 and is located on the top portions of the first and second storage units 121 and 122, returns from the first and second storage units 121 and 122 to the rotary chamber 110. In this case, since the component 13 having the smaller size or specific gravity than the component 11 is located on the top portions of the first and second storage units 121 and 122, the component 13 smoothly returns to the rotary chamber 110 without being disturbed by the first and second return prevention units 123a and 125a. However, although the component 11 located on the bottom portions of the first and second storage units 121 and 122 is affected by the gravity more than the centrifugal force, the first and second return prevention units 123a and 125a prevent the component 11 from returning to the rotary chamber 110, and thus the component 11 still remains in the first and second storage units 121 and 122.

Figure 9:
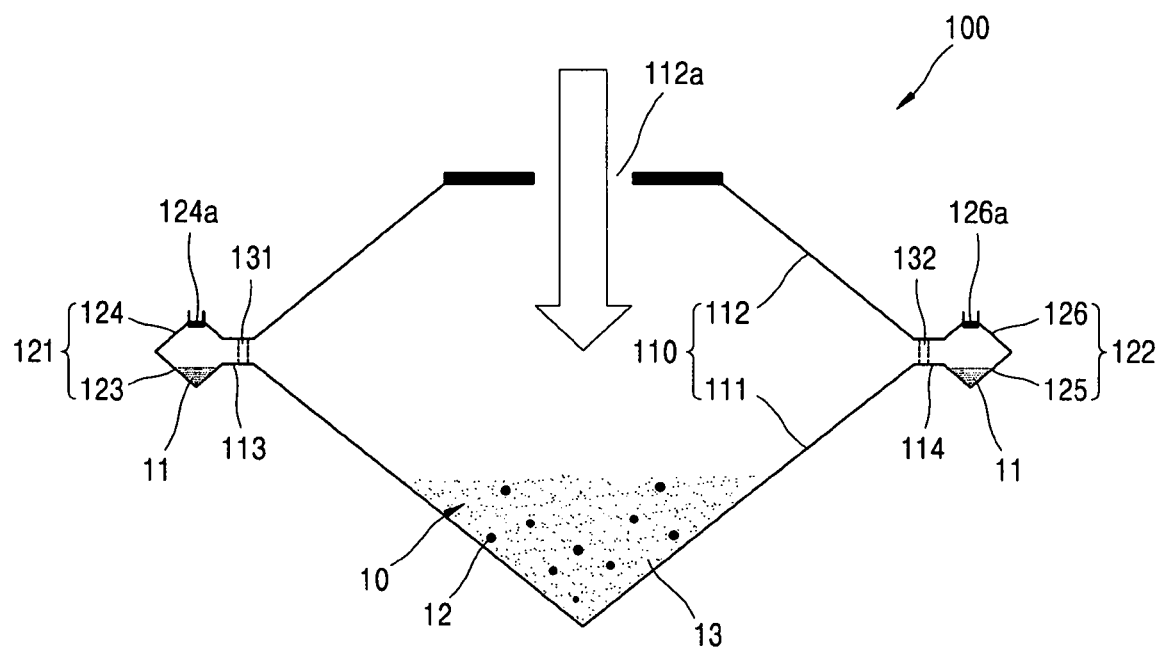
FIG. 9 is a vertical cross-sectional view of a centrifuge that schematically illustrates a state in which a certain component, which is sought to be separated from a substance to be centrifuged, remains in a storage unit when a rotary chamber rotates and is stopped.

When the centrifugal force according to the rotation of the rotary chamber 110 stops being applied, as illustrated in FIG. 9, the component 11 remains in the first and second storage units 121 and 122, but the component 13 having the smaller size or specific gravity than the component 11 does not remain therein. Then, the component 11, which is sought to be separated and remaining in the first and second storage units 121 and 122, is discharged to the outside through the first and second outlets 124a and 126a. Alternatively, before the component 11, which is sought to be separated and remaining in the first and second storage units 121 and 122, is discharged to the outside, the substance 10 being subject to the centrifugation is additionally injected into the rotary chamber 110, and a centrifugation process is repeatedly performed. Therefore, content of the component 11, which is sought to be separated and remaining in the first and second storage units 121 and 122, may be increased.

After the component 11, which is sought to be separated and remaining in the first and second storage units 121 and 122, is discharged to the outside, the above process is repeatedly performed.

Embodiment 2

Figure 10:
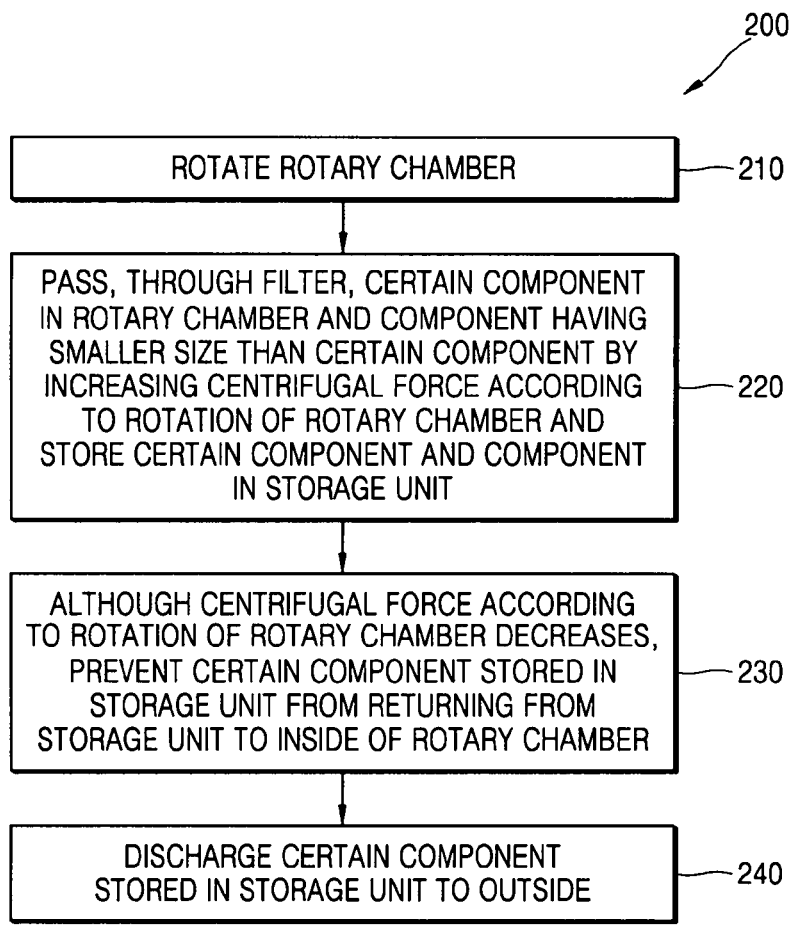
FIG. 10 is a schematic flowchart of a method of separating a certain component from a substance, which is contained in a rotary chamber, by centrifugal force according to rotation of the rotary chamber.

As illustrated in FIG. 10, the present embodiment relates to a centrifugation method 200. The centrifugation method 200 includes operation 210 in which a rotary chamber, which contains a substance to be centrifuged, rotates so that centrifugal force acts on the substance to be centrifuged. When the substance is injected into the rotary chamber, the substance may be injected by opening a cover of an inlet of the rotary chamber or using an injection pipe connected to the inlet.

Then, in operation 220, by passing the substance in the rotary chamber through a filter by increasing the centrifugal force according to the rotation of the rotary chamber, a certain component and a component having a smaller size than the certain component are separated from the substance in the rotary chamber and stored in a storage unit.

When the centrifugal force according to the rotation of the rotary chamber is applied, the substance in the rotary chamber moves upwards along an inclined inner surface of the rotary chamber, passes through the filter on an upper outer side of the rotary chamber, and reaches the storage unit. In this case, a component having a greater size than the certain component fails to pass through the filter. The certain component is located on a bottom portion of the storage unit, and the component having the smaller size than the certain component is located on a top portion of the storage unit.

Then, in operation 230, the certain component stored in the storage unit remains therein by decreasing the centrifugal force according to the rotation of the rotary chamber, and the component, which has the smaller size than the certain component and is stored in the storage unit, returns to the rotary chamber by the gravity. The certain component stored in the storage unit is prevented from returning to the rotary chamber by the gravity. To this end, the storage unit may include a return prevention unit for blocking a path in which the certain component stored in the storage unit returns to the rotary chamber by the gravity. As a result, in the storage unit, the certain component remains, but the component having the smaller size than the certain component does not remain.

Then, in operation 240, the certain component remaining in the storage unit is discharged to the outside. Such discharge may be performed through a hose connected to an outlet of the storage unit.

INDUSTRIAL APPLICABILITY

The present disclosure may be applicable to a centrifuge and a centrifugation method of separating a large amount of substances.

The invention claimed is:

1. A centrifuge comprising:
a rotary chamber configured to rotate so that centrifugal force acts on a substance contained in the rotary chamber;
a storage unit configured to store a certain component separated from the substance in the rotary chamber by the centrifugal force according to rotation of the rotary chamber; and
a filter located between the storage unit and the rotary chamber and through which the certain component, which is separated from the substance in the rotary chamber by the centrifugal force according to the rotation of the rotary chamber, passes to be stored in the storage unit,
wherein the storage unit comprises a return prevention unit configured to prevent the certain component, which is separated from the substance in the rotary chamber by the centrifugal force according to the rotation of the rotary chamber and is stored in the storage unit, from returning from the storage unit to the rotary chamber, and
wherein the return prevention unit has an inclined surface that is inclined upwards from a bottom of the storage unit to a top portion of the return prevention unit that is connected to the rotary chamber.

2. The centrifuge of claim 1, wherein a vertical cross-section of the rotary chamber narrows from a top portion to a bottom portion of the rotary chamber, and a horizontal cross-section area of the rotary chamber decreases from the top portion to the bottom portion of the rotary chamber.

3. The centrifuge of claim 1, wherein the storage unit comprises a plurality of storage elements arranged at locations that are symmetrical to each other with respect to a rotation center axis of the rotary chamber.

4. The centrifuge of claim 1, wherein the return prevention unit is configured to allow a component, which has a smaller size than the certain component separated from the substance in the rotary chamber by the centrifugal force according to the rotation of the rotary chamber and being stored in the storage unit, to return from the storage unit to the rotary chamber.

5. The centrifuge of claim 1, wherein the filter does not pass a component having a greater size than the certain component separated from the substance in the rotary chamber.

6. The centrifuge of claim 1, wherein a size of a mesh of the filter ranges from 1 μm to 2000 μm.

7. The centrifuge of claim 1, wherein a size of a mesh of the filter ranges from 10 μm to 1000 μm.

8. The centrifuge of claim 1, further comprising:
a cover configured to cover a top portion of the rotary chamber; and
a storage cover configured to cover a top portion of the storage unit.

9. A centrifugation method comprising:
rotating a rotary chamber containing a substance to be centrifuged so that centrifugal force acts on the substance;
passing, through a filter, the substance in the rotary chamber by increasing the centrifugal force according to rotation of the rotary chamber, separating a certain component and a component having a smaller size than the certain component from the substance, and storing the certain component and the component in a storage unit;
allowing the certain component stored in the storage unit to remain in the storage unit by decreasing the centrifugal force according to the rotation of the rotary chamber, and allowing the component having the smaller size than the certain component stored in the storage unit to return to the rotary chamber by gravity; and
discharging the certain component remaining in the storage unit to the outside.

10. The centrifugation method of claim 9, wherein the filter does not pass a component having a greater size than the certain component in the rotary chamber from the substance in the rotary chamber.

11. The centrifugation method of claim 9, wherein the certain component stored in the storage unit is prevented from returning to the rotary chamber by gravity.

12. The centrifugation method of claim 9, wherein the certain component remaining in the storage unit is discharged to the outside through a discharge pipe connected to an outlet of the storage unit.

* * * * *